United States Patent Office 3,483,151
Patented Dec. 9, 1969

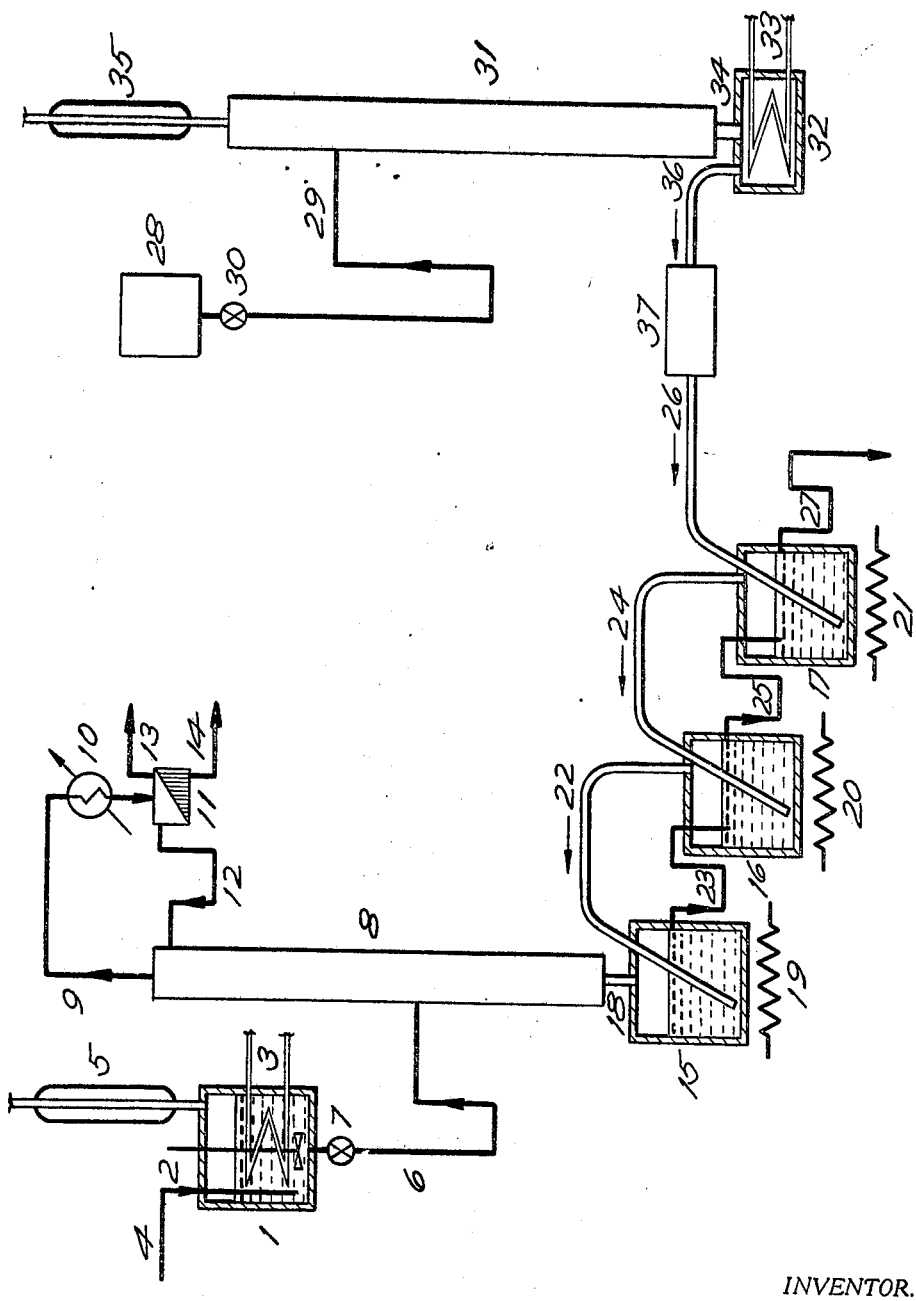

3,483,151
CONTINUOUS PROCESS FOR THE PREPARATION
OF POLYESTERS
Paul Biarnais, Louis Alheritiere, Georges Gobron, Jules Mercier, Gaston Meunier, and Rene Lemaistre, Melle, France, assignors to Les Usines de Melle (Societe Anonyme), Saint-Leger-les-Melle, Deux-Sevres Department, France, a corporation of France
Filed May 5, 1967, Ser. No. 636,304
Claims priority, application France, June 10, 1966, 65,062
Int. Cl. C08g 17/003, 17/18, 17/10
U.S. Cl. 260—22
13 Claims

ABSTRACT OF THE DISCLOSURE

This disclosure describes a continuous process for the preparation of polyesters in which the polycarboxylic and polyhydroxy reactants are initially heated to a temperature of about 50° C. to 200° C. and then passed through a reaction zone counter-current to a water entrainer at a temperature which is sufficiently high to effect intermolecular dehydration, whereby the water is entrained and removed from the reaction zone as it forms.

BACKGROUND OF INVENTION

This invention relates to a continuous process for producing polyesters by condensation of acid reactants and hydroxy reactants to effect esterification while passing the reaction mixture counter-current to a water entrainer.

It is known that polyesters, more particularly high molecular weight polyesters such as polyester resins are produced by intermolecular polycondensation of an organic acid reactant and an organic polyhydroxy compound. Suitable acid reactants include polycarboxylic acids especially di- and tricarboxylic acids, and anhydrides thereof. They may be, for example, open chain aliphatic or alicyclic or aromatic. Polyhydroxy compounds may be selected from, for example, open chain aliphatic, or alicyclic or aromatic alcohols including especially di- and trihydroxy compounds. The reactants may be saturated or unsaturated.

The reaction may be carried out in the presence of at least one monocarboxylic acid or monohydroxy alcohol which function as chain stoppers.

In conventional processes for producing polyesters, more particularly polyester resins, the acid reactants and the hydroxy reactants, optionally with one or more stabilizers such as antioxidants or polymerization inhibitors, are placed into a reaction vessel provided with a stirring device, heating means and distillation means for removing the reaction water. The operation is ordinarily carried out in an inert atmosphere such as oxygen-free nitrogen or carbon dioxide. The polyesterification reaction is performed by gradually increasing the temperature up to and maintaining it at a value between 180° and 250° C., according to the kind of polyester to be produced. The removal of the water is usually facilitated by working under reduced pressure. The extent of the polycondensation may be followed by removing aliquots from the reaction mixture which are measured for acidity or by continuously following the acidity with a suitable measuring device. Heating is discontinued when the desired degree of polycondensation has been attained.

The process is a batchwise operation, and is extremely time consuming. Morover, there is a problem of reproducibility of product, since it is difficult to control the operating conditions from batch to batch.

SUMMARY OF THE INVENTION

In accordance with the process of the present invention intermolecular dehydration or polyesterification takes place in a heated reaction zone while passing the reaction mixture counter-currently to vapors of a water entrainer. The reaction mixture will, as will be explained hereinafter, enter one end of the reaction zone while the entrainer vapors are continuously introduced at the other. The vapors continuously bubble through the reaction mixture picking up the water formed by the polycondensation so that water and entrainer can be continuously removed from the reaction zone at the same end that the reaction mixture enters the zone.

The starting reactants may include any and all conventional reactants used for producing polyesters. They may be saturated or unsaturated. The reaction mixture may be modified or unmodified by monocarboxylic acid reactants or monohydroxy reactants. The polyesters produced include polester resins and polymer plasticizers as well as polymerizable plasticizers.

Suitable acid reactants may include one or more of the following acids, or anhydrides thereof: saturated or unsaturated dicarboxylic aliphatic acids, such as succinic, adipic, sebacic, maleic, fumaric, itaconic, aromatic or alicyclic acids, such as o-phthalic, isophthalic, terephthalic, trimellitic, tetrahydrophthalic, cis-endomethylene tetrahydophthalic, hexa-hydrophthalic, tetrachlorphthalic, hexachlor-endomethylene tetrahydrophthalic and the like.

As examples of polyhydroxy compounds for use in the invention there may be mentioned one or more of the following: propylene glycols, ethylene glycol, diethylene glycol, triethylene glycol, tetraethylene glycol, neopentyl glycol, butylene glycols, dipropylene glycol, glycerol, trimethylol propane, pentaerythritol, hydrogenated bisphenol A and derivatives thereof, and the like.

Suitable modifying monocarboxylic organic acid reactants which may be employed if desired include one or more of the following acids, or anhydrides thereof: acetic, stearic, methacrylic, oleic, linoleic, benzoic, and the like.

Suitable modifying monohydroxy organic compounds which may be employed if desired include one or more of the following: butanols, n-heptanol, 2-ethyl hexanol, and the like.

Suitable water entrainers include organic liquids conventionally used for this purpose such as ethers, esters, hydrocarbons or halogenated hydrocarbons. Preferred water entrainers from the point of view of economics and efficiency include saturated and aromatic hydrocarbons containing up to seven carbon atoms such as benzene, toluene, n-hexane, cyclohexane, methyl cyclohexane, n-heptane, and mixtures thereof.

Likewise, the stabilizers which it is possible to use are all those conventionally employed in polyester manufacture including for example hydroquinone, benzoquinone, 1,4-naphthoquinone, p-methoxy phenol, catechol, 3-methyl catechol, 3-isopropyl catechol, p-tertiobutyl catechol, and the like. Preferably the stabilizer is used in an amount between 10 and 250 p.p.m with respect to the final polyester or the final mixture of polyester resin with a reticulation monomer copolymerizable therewith.

The process of the present invention is preferably carried out in the following manner.

The starting reactants, and stabilizers if any, are introduced into a mixing vessel provided with a stirring device and maintained under an atmosphere of oxygen-free, inert gas, and in this vessel the mixture is heated to and maintained at a temperature between 50° and 200° C, which temperature is so controlled that the polycondensation or polyesterification reaction by dehydration does not, or substantially does not, occur. There is substantially no water formation at this stage of the process accordingly.

The initial mixture so obtained generally has a composition which depends upon whether acids or anhydrides are used as starting reactants. If acids are used, the mixture may be a mere solution or dispersion of the acid or acids in the hydroxy compound or compounds. If anhydrides are used, there is formed in the mixture monoesters of organic diacids, without water formation, by anhydride-polyalcohol exothermic reaction.

The initial mixture is then introduced continuously into the reaction zone. In one form of reaction zone the mixture is introduced continuously into a first reaction vessel, or reactor, of a series of reactors, preferably heated; the reaction mixture passes through the series of reactors counter-currently with respect to vapors of a water entrainer which is introduced continuously into the last reactor of the series, the water entrainer vapors being bubbled through the reaction mixture in the reactors. In this form of reaction zone, the reactors may be arranged cascade-like. In another form the reaction zone may be constituted by the plates of a plate column, desirably of the "deep plate column" type. When a plate column is used, the column is heated at its base but it is recommended that each plate be provided with auxiliary heating means. The column is fed at its top with the reactant mixture and at its base with the water entrainer.

The temperatures prevailing in the reaction zone are sufficiently elevated to effect dehydration and may vary over a wide range. Generally temperatures from about 180° C. to 260° C. are effective. Normally the temperature in the reaction zone will gradually increase with distance from the end at which the reactants enter.

The reaction mixture may flow from a reactor in a cascade into the following one in a series, for example through overflows or siphons. Preferably the water entrainer is fed in vapor state into the last reactor, through or near the bottom thereof.

To minimize the possibility of side reactions, especially oxidations, it is best, although not essential, to remove air from the entrainer in a degassing operation before the entrainer enters the reaction zone. To remove the air which may be dissolved in the water entrainer it is recommended to introduce the entrainer continuously into the head portion of a de-gassing column in which it is brought to boiling. At the foot of the de-gassing column there may be provided a boiler from which water entrainer vapors are taken off to be introduced into the last reactor of the series.

The mixture of water and entrainer vapors, after bubbling through the successive reaction stages, is withdrawn from the first reactor and introduced into a distillation apparatus which effects separation of the hydroxy reactant or reactants entrained by the water vapor and entrainer vapor. This distillation apparatus comprises a plate column, a condenser and a decanter allowing the reaction water to be removed and a portion of the water entrainer to be refluxed to the top portion of the column, the remainder of the entrainer being withdrawn, purified by rectification, then re-used. The hydroxy reactant or reactants entrained is or are withdrawn from the base portion of the distillation column and sent back to the first reactor of the series.

It is also preferred, although not essential, to remove the air which may be dissolved in the mixture issuing from the mixing vessel. This may be effected by introducing this mixture not directly into the first reactor of the series, but, at a suitable level, into the distillation column in which the mixture of water, water entrainer and hydroxy reactant or reactants coming from the reaction zone is separated into its constituents.

The desired acidity in the reaction product which, as aforesaid, is a measure of the extent of the reaction is obtained by controlling the temperature and the time of the reaction. The latter is, of course, a function of the type of reaction zone utilized, the size and the rate of through-put. Generally the reaction time, that is the average period of time that the reactants spend in traversing the reaction zone is from about one to five hours. The preferred reaction temperature is as stated above, from about 180° C. to about 260° C.

If desired, it is possible to dilute continuously the polyester so obtained, by means of a liquid copolymerizable monomer to ensure subsequent reticulation or cross-linking of the polyester, as is well known. One may use for this purpose, unsaturated monomers such as styrene or derivatives thereof such as chlorstyrenes α-methyl styrene or divinyl benzene, allyl esters such as diallyl o-phthalate or triallyl cyanurate, vinyl esters such as vinyl acetate, or else esters derived from olefinic acids, such as methyl methacrylate, methyl itaconate, and the like. When the reaction is carried out in a plate column, the polyester is withdrawn continuously from the base thereof and may then be diluted continuously with a copolymerizable monomer, as disclosed above. Of course this column is surmounted by a distillation device such as above described and serving for the same purpose.

The process of the present invention permits manufacture of polyesters especially polyester resins, having the properties and characteristics of such kinds of products. A particular advantage of the invention is that it permits manufacture of polyester resins having excellent color characteristics, i.e., very slightly colored. Moreover, at a given temperature the present process requires a reaction time much shorter than that required by conventional, discontinuous processes. The time saving as compared with such conventional processes may be as high as 30%–50%.

THE DRAWING

The following description, with reference to the annexed drawing illustrating one embodiment of the invention, will show one manner in which the process of the invention may be realized.

The drawing diagrammatically represents an apparatus suitable for carrying out the process of the invention.

In the apparatus represented, the starting reactants are introduced batchwise into a mixing vessel 1 provided with a stirrer 2, a heating device 3 with steam passing therethrough, an inert gas feeding pipe 4 and a reflux condenser 5.

The liquid mixture which is withdrawn from vessel 1 by a pipe 6 provided with a control valve 7 is, preferably, continuously introduced into a distilling plate column 8 surmounting the first reactor 15, instead of being introduced directly into said first reactor. In column 8, which is fed at its base with the vapors evolved by the first reactor 15, the separation of the reaction water and water entrainer from the excess hydroxy reactant or reactants takes place. The former pass upwards. The latter flow back through the base of the column into said first reactor together with the mixture of reactants introduced by pipe 6 and de-gassed by its passage through column 8.

The head vapors from column 8 issue by a pipe 9 and are liquefied in a condenser 10, the condensed liquid being introduced into a decanter 11. A portion of the water entrainer (which constitutes the upper layer in the decanter) is refluxed to the top of column 8 by a pipe 12. The remainder of the water entrainer layer is withdrawn by a pipe 13 and purified by rectification in a rectifying apparatus (not shown). The water, which constitutes the lower layer in the decanter, is discarded by a pipe 14.

The reactor 15, which receives by a pipe 18 the liquid mixture issuing from the base of column 8, is the first one of a series of three similar reactors 15, 16, 17 arranged cascade-like and provided with electric heating means 19, 20, 21 respectively. Through the liquid contained in reactor 15 bubble continuously the vapors, mainly composed of entrainer and water, which issue from the top of reactor 16 by a pipe 22, while liquid from reactor 15 flows continuously into reactor 16 by overflow through pipe 23. Likewise, through the liquid contained in reactor 16 bubble continuously the entrainer and water vapors which issue from reactor 17 by a pipe 24, while liquid from reactor 16 flows continuously into reactor 17 through a pipe 25. Finally, through the liquid contained in reactor 17 bubble continuously entrainer vapors introduced by a pipe 26, while the final reaction mixture is continuously withdrawn by a pipe 27 and may be sent, if desired, to the operation of dilution by a copolymerizable monomer.

Vessel 28 is a storage tank for pure water entrainer and receives recovered entrainer which has been previously used and has been withdrawn by pipe 13 and purified by rectification, as aforesaid. By means of a pipe 29 provided with a control valve 30 the water entrainer is continuously fed to column 31 in which it is de-gassed. At the base of column 31 is provided a boiler 32 heated by means of a coil 33 through which is passed heating steam and at the top of the column is provided a reflux condenser 35. The entrainer, after being de-gassed in column 31, flows from the foot thereof, through a tube 34, into the boiler 32. The vapors evolved in this boiler serve partly to heat column 31 through tube 34 and partly to feed, through a pipe 36, an overheater 37 in which the entrainer vapor is heated to the desired temperature before being introduced into reactor 17 by pipe 26.

The following non-limiting examples are illustrative of the invention.

Example 1

There is introduced into mixing vessel 1 of the apparatus described 3867 grams of 1,2-propylene glycol, 3552 grams of phthalic anhydride and 2352 grams of maleic anhydride. There is then added 1.60 grams of hydroquinone, i.e. about 120 p.p.m. with respect to the weight of polyestercopolymerizable monomer mixture which will be produced at the end of the operation. The reactant mixture in vessel 1 is then heated to 120° C. while maintaining it under an atmosphere of pure nitrogen introduced by pipe 4. Under these conditions hydrogen propylene glycol phthalate and hydrogen propylene glycol maleate are formed in the mixture. This mixture will serve to feed first reactor 15 through the intermediary of column 8.

The series of reactors, maintained at a temperature of about 210° C., are continuously fed with 900 grams per hour of the mixture at 120° C. withdrawn from vessel 1, while introducing into reactor 17 by pipe 26 about 1 liter per hour (reckoned as liquid) of vapor of previously de-gassed cyclohexane as a water entrainer.

The average reaction time is 2 hours and 15 minutes.

In normal running, determination of the free acidity in the various reactors gives the following results:

| | Equivalents/kg. |
|---|---|
| Mixing vessel | 4.2 |
| 1st reactor | 2.11 |
| 2nd reactor | 1.25 |
| 3rd reactor | 0.8 |

The polyester withdrawn from the third reactor is immediately and continuously diluted with half of its weight of styrene (or any other copolymerizable monomer, as desired). The polyester produced possesses all desirable characteristics of the products of the same kind prepared by conventional techniques, more particularly excellent color characteristics, namely, 0.6 yellow+0.1 red (Lovibond 6″ measure), or 20 APHA.

It is possible to shorten the average reaction time by increasing the operating temperature. But in so doing the color characteristics of the polyester produced are somewhat less good. This is apparent from the following example.

Example 2

The reactant mixture is prepared in mixing vessel 1 in the manner described in Example 1.

The series of reactors, maintained at temperatures between 230° and 235° C., is continuously fed with 1300 g./hr. of reactant mixture at 120° C. withdrawn from vessel 1, as described in Example 1. The series of reactors is also fed with cyclohexane as in Example 1.

In normal running, determination of the free acidity in the various reactors gives the following results:

| | Equivalents/kg. |
|---|---|
| Mixing vessel | 4.17 |
| 1st reactor | 1.58 |
| 2nd reactor | 0.79 |
| 3rd reactor | 0.47 |

It is thus seen that at the exit from the second reactor the acidity figure is the same as that of the third reactor in Example 1. This figure at this time corresponds to an average reaction time of only one hour.

The color characteristics (Lovibond 6″) of the polyester produced are 2.3 yellow+0.2 red, or about 60 APHA.

Example 3

Into mixing vessel 1 there is introduced 4370 g. of 1,2-propylene glycol, 3996 g. of phthalic anhydride and 2254 g. of maleic anhydride, then there is added 1.61 g. of hydroquinone, i.e., 100 p.p.m. with respect to the weight of polyester-copolymerizable monomer mixture which will be produced at the end of the operation. The reactant mixture in vessel 1 is then heated to 120° C. as described in Example 1.

The series of reactors, maintained at temperatures between 210° and 215° C., is continuously fed with an average amount of 850 g./hr. of reactant mixture at 120° C. withdrawn from vessel 1, as described in Example 1. The series of reactors is also fed with cyclohexane as in Example 1.

The average reaction time is between 2 hours and 20 minutes and 2 hours and 25 minutes.

The acidity of the reaction mixture at equilibrium, at the exit from the last reactor, is 0.48 equivalent/kg. The polyester withdrawn from the last reactor is immediately and continuously diluted with half of its weight of the desired copolymerizable monomer. The color figure of the diluted polyester is 20 APHA.

Examples 4-8

The reactant mixtures being prepared as described in Example 3, the operations are carried out under the conditions set forth in Table I.

the exit from the last reactor, is 0.66 equivalent/kg. The polyester withdrawn from the last reactor is immediately and continuously diluted with half of its weight of the desired copolymerizable monomer.

TABLE I

| Example | 4 | 5 | 6 | 7 | 8 |
|---|---|---|---|---|---|
| Temperature of the reactors | 230°–235° C | Reactor: 15, 210° C.; 16, 230° C.; 17, 250° C. | 230°–235° C | 230°–235° C | 220°–225° C. |
| Feed rate of reactant mixture at 120° C. withdrawn from vessel 1 | 1,300 g./hr | 900 g./hr | 1,300 g./hr | 450 g./hr | 1,600 g./hr. |
| Water entrainer | Cyclohexane | Cyclohexane | Benzene | Cyclohexane | Cyclohexane. |
| Average reaction time | 1 hr. 20 min | 2 hr. 15 min | 1 hr. 20 min | 4 hr. 20 min | 1 hr. 10 min. |
| Acidity of the reaction mixture at the exit from the last reactor (equiv./kg.) | 0.42 | 0.31 | 0.32 | 0.11 | 0.60. |
| Polyesterification catalyst | None | None | isopropyl titanate (6.5 grams) | None | None. |
| Color (Lovibond 6″) (APHA) | Not measured | Not measured | Not measured | Not measured | 0.8 yellow. 25. |

Example 9

Into mixing vessel 1 there is introduced 4750 g. of 1,2-propylene glycol, 3996 g. of phthalic anhydride and 2254 g. of maleic anhydride, then there is added 1.67 g. of hydroquinone, i.e., 100 p.p.m. with respect to the weight of polyester-copolymerizable monomer mixture which will be produced at the end of the operation. The reactant mixture in vessel 1 is then heated to 120° C. as described in Example 1.

The series of reactors, maintained at temperatures between 230° and 235° C., is continuously fed with 450 g./hr. of reactant mixture at 120° C. withdrawn from vessel 1, as described in Example 1. The series of reactors is also fed with cyclohexane as in Example 1.

The average reaction time is 4 hours and 30 minutes.

The acidity of the reaction mixture at equilibrium, at the exit from the last reactor, is 0.11 equivalent/kg. The polyester withdrawn from the last reactor is immediately and continuously diluted with half of its weight of the desired copolymerizable monomer.

Example 10

The reactant mixture is prepared in vessel 1 in the manner described in Example 9.

The series of reactors, maintained at temperatures between 220° and 225° C., is continuously fed with 1600 g./hr. of reactant mixture at 120° C. withdrawn from vessel 1, as described in Example 1. The series of reactors is also fed with cyclohexane as in Example 1.

The average reaction time is 1 hour and 10 minutes.

The acidity of the reaction mixture at equilibrium, at the exit from the last reactor, is 0.62 equivalent/kg. The polyester withdrawn from the last reactor is immediately and continuously diluted with half of its weight of the desired copolymerizable monomer.

Example 11

Into mixing vessel 1 there is introduced 2618 g. of 1,2-propylene glycol, 1966 g. of diethylene glycol, 3700 g. of phthalic anhydride and 2450 g. of maleic anhydride, then there is added 2.93 g. of p-tertiobutyl catechol, i.e. about 200 p.p.m. with respect to the weight of polyester-copolymerizable monomer mixture which will be produced at the end of the operation. The reactant mixture in vessel 1 is then heated to 100° C. as described in Example 1.

The series of reactors, maintained at temperatures between 210° and 215° C., is continuously fed with 900 g./hr. of reactant mixture at 100° C. withdrawn from vessel 1, as described in Example 1. The series of reactors is also fed with water entrainer, as described in Example 1, but there is used benzene instead of cyclohexane.

The average reaction time is 2 hours and 15 minutes.

The acidity of the reaction mixture at equilibrium, at the exit from the last reactor, is 0.66 equivalent/kg. The polyester withdrawn from the last reactor is immediately and continuously diluted with half of its weight of the desired copolymerizable monomer.

Example 12

Into mixing vessel 1 there is introduced 4028 g. of 1,2-propylene glycol, 2450 g. of maleic anhydride and 3800 g. of tetrahydrophthalic acid, then there is added 1.56 g. of hydroquinone, i.e. about 100 p.p.m. with respect to the weight of polyester-copolymerizable monomer mixture which will be produced at the end of the operation. The reactant mixture in vessel 1 is then heated to 120° C. as described in Example 1.

The series of reactors, maintained at temperatures between 210° and 215° C., is continuously fed with 800 g./hr. of reactant mixture at 120° C. withdrawn from vessel 1, as described in Example 1. The series of reactors is also fed with water entrainer, as described in Example 1, but there is used methyl cyclohexane instead of cyclohexane.

The average reaction time is 2 hours and 30 minutes.

The acidity of the reaction mixture at equilibrium, at the exit from the last reactor, is 0.65 equivalent/kg. The polyester withdrawn from the last reactor is immediately and continuously diluted with half of its weight of the desired copolymerizable monomer.

Example 13

Into mixing vessel 1 there is introduced 4028 g. of 1,2-propylene glycol, 2450 g. of maleic anhydride and 3650 g. of adipic acid, then there is added 1.09 g. of benzoquinone, i.e. about 80 p.p.m. with respect to the weight of polyester-copolymerizable monomer mixture which will be produced at the end of the operation. The reactant mixture in vessel 1 is then heated to 100° C. as described in Example 1.

Then the operation is carried out as described in Example 11, but the water entrainer used is n-hexane.

The acidity of the reaction mixture at equilibrium, at the exit from the last reactor, is 0.59 equivalent/kg. The polyester withdrawn from the last reactor is immediately and continuously diluted with half of its weight of the desired copolymerizable monomer.

Example 14

Into mixing vessel 1 there is introduced 4494 g. of diethylene glycol, 2920 g. of adipic acid and 1960 g. of maleic anhydride, then there is added 1.33 g. of benzoquinone, i.e. about 80 p.p.m. with respect to the weight of polyester-copolymerizable monomer mixture which will be produced at the end of the operation. The reactant mixture in vessel 1 is then heated to 140° C., then the temperature in vessel 1 is lowered to and maintained at 100° C., under an atmosphere of pure nitrogen as described in Example 1.

The series of reactors, maintained at temperatures between 210° and 215° C., is continuously fed with 900 g./hr. of reactant mixture at 100° C. withdrawn from vessel 1, as described in Example 1. The series of reactors is also fed with cyclohexane as in Example 1.

The average reaction time is 2 hours and 15 minutes.

The acidity of the reaction mixture at equilibrium, at the exit from the last reactor, is 0.54 equivalent/kg. The polyester withdrawn from the last reactor is immediately and continuously diluted with its weight of the desired copolymerizable monomer.

Example 15

Into mixing vessel 1 there is introduced 1860 g. of ethylene glycol, 4440 g. of tetrachlorphthalic anhydride and 1558 g. of maleic anhydride, then there is added 2.02 g. of hydroquinone, i.e. about 200 p.p.m. with respect to the weight of polyester-copolymerizable monomer mixture which will be produced at the end of the operation. The reactant mixture in vessel 1 is then heated to 150° C., then the temperature in vessel 1 is lowered to and maintained at 120° C., under an atmosphere of pure nitrogen as described in Example 1.

The series of reactors, maintained at about 200° C., is continuously fed with 1200 g./hr. of reactant mixture at 120° C. withdrawn from vessel 1, as described in Example 1. The series of reactors is also fed with cyclohexane as in Example 1.

The average reaction time is 1 hour and 40 minutes.

The acidity of the reaction mixture at equilibrium, at the exit from the last reactor, is 0.72 equivalent/kg. The polyester withdrawn from the last reactor is immediately and continuously diluted with 40% of its weight of the desired copolymerizable monomer.

What is claimed is:

1. A continuous process for the preparation of polyesters which comprises:
    (1) heating an initial liquid mixture containing a dibasic organic acid reactant and a polyhydroxy alcohol to a tempearture of from 50° C. to 200° C. under conditions such that no substantial dehydration takes place;
    (2) continuously passing the heated mixture into the first end of a reaction zone, in which zone the temperature is sufficiently high to effect dehydration of the mixture and formation of water;
    (3) continuously introducing vapors of an organic liquid water entrainer into the second end of said zone so that the vapors bubble through the liquid heated mixture and entrain the water formed by the dehydration;
    (4) continuously collecting reaction product from the second end of said zone; and
    (5) continuously collecting the organic vapors having water entrained therein from the first end of said zone.
2. A process as in claim 1 in which the temperature in the reaction zone is maintained at from about 180° C. to about 260° C.
3. A process as in claim 1 in which water formed by the dehydration reaction and water entrainer are separated by a distilling column, after leaving the reaction zone.
4. A process as in claim 3 in which the heated mixture passes through the distilling column before entering the reaction zone thereby to be degassed.
5. A process as in claim 1 in which the initial mixture contains at least one monocarboxylic acid or alcohol.
6. A process as in claim 1 in which the initial mixture contains a stabilizer.
7. A process an in claim 1 in which the reaction zone is a series of separately heated reaction vessels arranged as a cascade.
8. A process as in claim 1 in which the reaction zone is a plate column heated at its base.
9. A process as in claim 1 in which the reaction zone is a deep plate column in which the plates are individually heated.
10. A process as in claim 1 in which the water entrainer is degassed before entering the reaction zone.
11. A process as in claim 1 in which the water entrainer is at least one aromatic or saturated hydrocarbon containing up to seven carbon atoms.
12. A process as in claim 11 in which the water entrainer is selected from the group consisting of benzene, toluene, n-hexane, cyclohexane, methyl cyclohexene, n-heptane and mixtures thereof.
13. A process as in claim 1 which further comprises diluting the polyester produced by the addition of a copolymerizable monomer, to effect reticulation of the polyester.

References Cited

UNITED STATES PATENTS

| | | | |
|---|---|---|---|
| 2,988,524 | 6/1961 | Fitch | 260—76 |
| 3,055,869 | 9/1962 | Wilson et al. | 260—75 |
| 3,109,832 | 11/1963 | Seiner | 260—75 |
| 3,127,376 | 3/1964 | Lindenauer et al. | 260—75 |
| 3,390,135 | 6/1968 | Seiner | 260—75 |
| 3,390,965 | 7/1968 | Bachmann et al. | 260—75 |

DONALD E. CZAJA, Primary Examiner

R. W. GRIFFIN, Assistant Examiner

U.S. Cl. X.R.

260—45.95, 75, 76, 77, 860, 861, 872, 873